Patented Apr. 3, 1923.

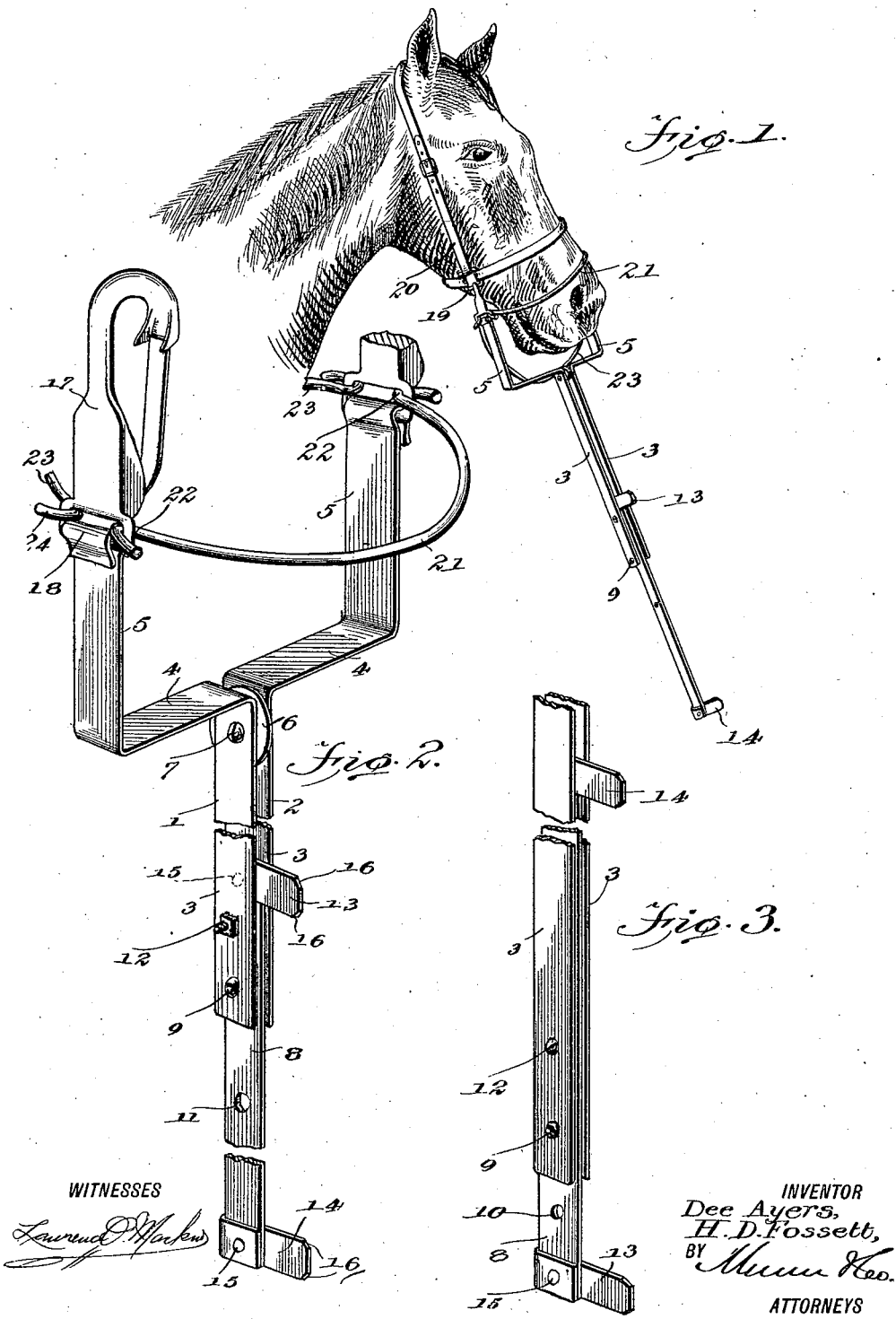

1,450,237

UNITED STATES PATENT OFFICE.

DEE AYERS AND HAL DEE FOSSETT, OF MOUNT VERNON, MISSOURI.

ANIMAL POKE.

Application filed March 21, 1922. Serial No. 545,439.

*To all whom it may concern:*

Be it known that we, DEE AYERS and HAL DEE FOSSETT, citizens of the United States, and residents of Mount Vernon, in the county of Lawrence and State of Missouri, have invented certain new and useful Improvements in Animal Pokes, of which the following is a specification.

This invention relates to improvements in animal pokes and it consists in the combinations, constructions and arrangements herein described and claimed.

An object of our invention is to provide an animal poke having means whereby it may be detachably secured to a halter or head stall of ordinary construction and thus adapted for application successively to a plurality of animals.

A further object of our invention is to provide an animal poke which can be adjusted to vary the length thereof and thus render the device suitable for application to animals of different sizes.

A still further object of our invention is to provide an animal poke having means adapted to engage a fence or the like before the animal to which the poke is applied reaches the fence and to exert a pressure upon the nose of the animal, tending to restrain the animal from moving nearer to the fence.

Other objects and advantages of the invention will be apparent from the following description, and the novel features of the invention will be particularly outlined in the appended claims.

Our invention is illustrated in the accompanying drawings, forming a part of this application, in which Figure 1 is a view showing the poke operatively applied, Figure 2 is an enlarged perspective view, showing the poke detached and the reversible stem member thereof in one position, and Figure 3 is a fragmentary perspective view, showing the reversible stem member of the poke in a position the reverse of that illustrated in Figure 2.

In carrying out our invention, we make use of two similar bars which are indicated generally at 1 and 2 respectively and are preferably made of a light-gauge metal but may be made of any suitable material. Each bar consists of a straight body portion 3 extending from one end of the bar to a predetermined distance from the other end thereof and then being merged into a portion 4 extending substantially at right angles to the body portion 3 and being merged into an end portion 5 of the bar which extends substantially in parallelism with the body portion 3 and is therefore offset in respect to the latter. The body portions 3—3 are arranged in flatwise parallel relation with the laterally turned portions 4—4 extending oppositely in substantially the same plane. A spacer 6, which may be a washer, is interposed between the body portions 3—3 adjacent to their points of juncture with the laterally turned portions 4—4 and is retained in this position by a bolt 7 which connects the body portions at one end.

The body portions 3—3 are spaced apart intermediately and at their free ends by an elongated flat tongue 8 having a width substantially the same as that of the body portion 3 and a thickness or gauge slightly less than that of the spacer 6. The tongue 8 is pivotally attached to the body portions 3—3 through the agency of a pivot member 9, which may be a rivet or bolt projected through the body portions 3—3 and through the interposed tongue 8 adjacent to the free ends of the body portions 3—3 and intermediately of the length of the tongue 8, the arrangement being such that the distance from the pivot member 9 to one end of the tongue 8 is considerably greater than the distance from the pivot member 9 to the opposite end of the tongue 8.

With the arrangement just described, the tongue 8 would be free to swing about the axis of the pivot 9 to position the minor portion thereof between the body portions 3—3, as illustrated in Figure 2, or to position a major portion thereof between the body portions 3—3, as illustrated in Figure 3. The body portions 3—3 have registering openings formed therethrough at a predetermined distance from the pivot member 9 and the tongue 8 is formed with a similar opening 10 at one side of the pivot 9 in position to register with the opening through the body portions 3—3 when the tongue is in the position in which illustrated in Figure 2 and with a like opening 11 at the opposite side of the pivot 9 in position to register with the opening through the body portions 3—3 when the tongue is in the position illustrated in Figure 3. A bolt 12 or like fastening member may be projected through the registering openings of the body portions and the interposed tongue to releasably maintain the tongue selectively positioned as illustrated in Figures 2 and 3.

It will thus be manifest that the effective length of the tongue and the body portions combined can be varied at will by rotating the tongue 8 from the position in which illustrated in Figure 2 to the position in which illustrated in Figure 3 or vice versa.

The tongue 8 is provided at its opposite ends with laterally extending spikes or spurs 13 and 14 respectively, which preferably consist of elongated flat pieces of metal bent adjacent to one end to embrace the tongue and being secured to the latter by rivets 15, as shown. The spikes or spurs 13 and 14 preferably have the corners at their outer ends beveled or cut away as indicated at 16.

The offset portions 5—5 together with the laterally turned portions 4—4 serve as forks which are adapted to be placed at opposite sides of the head of an animal, such as the horse pictured in Figure 1. Snap fasteners or hooks 17—17 are attached to the offset portions 5—5 at the ends thereof, as at 18 and are adapted to be detachably connected with the rings 19 which are comprised in an ordinary halter or head stall 20 and are located at opposite sides of the jaws of the animal. With this arrangement, a curved wire member 21 of substantially U-shape having the ends thereof flexibly connected with the loops of the snaps or hooks 17, as indicated at 22—22, will span the nose of the animal. A wire member 23 which is identical in essential respects with the member 21 is flexibly attached, as at 24—24 to the snaps 17—17 to extend oppositely from the wire member 21, whereby the member 23 will span the lower jaw of the animal.

From the foregoing description of the various parts of the device, the operation thereof may be readily understood. As stated, the offset portions 5—5 and the laterally turned portions 4—4 constitute the forks of the poke and the straight body portions 3—3 and the tongue 8 comprise the stem of the poke. When the tongue 8 is in the position in which illustrated in Figure 2, the forks will be adjusted so that the wire member 21 spans the nose of the animal to which applied. When the tongue 8 has been moved into the position in which illustrated in Figure 3, the forks will be arranged relatively to the animal to which applied so that the wire member 23 spans the nose of the animal and the wire member 21 will then be arranged in the position formerly occupied by the wire member 23. In each instance, the spikes or spurs 13 and 14 carried by the stem will extend in advance of the stem and in position to engage a wire fence or like object approached by the animal to which the poke is applied. Should the animal attempt to approach nearer to the fence after the latter has been engaged by the spikes or spurs, as would be required in order that the animal may jump the fence or destroy the same, the forks will be swung about their connections with the rings 19 of the halter so that the wire spanning the nose of the animal will be forced against the nose of the animal. Further movement of the animal toward the fence or other obstruction will result in pain to the animal and thus the animal will be restrained from jumping the fence or other obstruction or from destroying the same. The device is applicable to animals of different sizes, particularly on account of the fact that the effective length of the stem may be varied in the manner described.

Obviously, our invention is susceptible of embodiment in forms other than that in which illustrated in the accompanying drawings, and we therefore consider as our own all modifications and adaptations of the form of the device disclosed herein which fall within the scope of the appended claims.

We claim:—

1. An animal poke comprising a stem provided with forwardly extending spikes, forks at the upper end of the stem, devices attached to said forks for securing the latter to a halter at opposite sides of the jaws of an animal to which the halter is applied, a curved wire member carried by said forks in position to span the nose of the animal, and a similar wire member carried by the forks in position to span the lower jaw of the animal, whereby the poke is reversible.

2. In an animal poke, a stem comprising a pair of straight body portions connected in spaced parallel relation adjacent to one end of the stem, fork portions integral with the body portions and being merged into the latter at the said end of the stem, fastening elements carried by said forks for attaching the latter to a halter, a wire member carried by the forks in position to span the nose of an animal to which the halter is applied, a tongue pivotally attached to the stem adjacent to the lower end of the latter in interposed relation to the body portions and at a greater distance from one end of the tongue than from the other end thereof, and spikes carried by the tongue at the opposite ends thereof.

3. In an animal poke, a stem comprising a pair of straight body portions connected in spaced parallel relation adjacent to one end of the stem, fork portions carried by the body portions at the said end of the stem, fastening elements carried by said forks for attaching the latter to a halter, and a tongue pivotally attached to the stem adjacent to the lower end of the latter in interposed relation to the body portions and at a greater distance from the one end of the tongue than from the other end thereof.

4. In an animal poke, a stem comprising a pair of straight body portions connected in spaced parallel relation adjacent to one end of the stem, fork portions carried by the body portions at the said end of the stem, fastening elements carried by said forks for attaching the latter to a halter, a tongue pivotally attached to the stem adjacent to the lower end of the latter in interposed relation to the body portions and at a greater distance from the one end of the tongue than from the other end thereof, spikes carried by the tongue at the opposite ends thereof, and means whereby the tongue may be locked to the body portions with either end thereof between said body portions.

DEE AYERS.
HAL DEE FOSSETT.